United States Patent [19]  [11] 4,361,947
Arnaud  [45] Dec. 7, 1982

[54] STORAGE CONTAINER AND METHOD OF MAKING SAME

[76] Inventor: Ronald L. Arnaud, 121 Culligan Ct., Boulder Creek, Calif. 95006

[21] Appl. No.: 236,028

[22] Filed: Feb. 19, 1981

[51] Int. Cl.³ ............................................ B23P 17/00
[52] U.S. Cl. ........................................ 29/416; 220/8; 228/170; 493/287; 72/367; 29/434
[58] Field of Search ................... 72/367; 493/56, 227, 493/271, 287; 29/412, 416, 234; 156/271, 294; 220/8, 345; 228/170, 173 F, 184; 406/184–189; 312/72, 73

[56] References Cited
U.S. PATENT DOCUMENTS
2,437,626 9/1943 Tinsley ................................ 228/119
3,733,037 5/1973 Vandiveer ........................... 406/189

Primary Examiner—Francis S. Husar
Assistant Examiner—Steven Nichols
Attorney, Agent, or Firm—Jack M. Wiseman; Francis W. Anderson

[57] ABSTRACT

A container includes two elongate tubular members, one telescoped within the other. The inner tube has an access opening in one section of an upper wall portion through which articles can be placed into and removed from the interior of the tube when the inner tube is withdrawn from the outer tube, the access opening being effectively closed when the inner tube is again telescoped into the outer tube.

4 Claims, 4 Drawing Figures

STORAGE CONTAINER AND METHOD OF MAKING SAME

BACKGROUND OF THE INVENTION

In outdoor activities, such as catamaran sailing, gear and accessories peculiar to that activity must sometimes be carried along. For example, to participate in catamaran sailing, one must transport sails, booms, tools, spare parts and the like. Since many of these outdoor activities involve the use of a trailer, it has been proposed to provide a container that could be readily mounted on the trailer between the hulls of a catamaran for storing the accessories during transporting. These containers are usually rather large and require a considerable amount of space on the trailer. Further, they each require a door that must be either bodily lifted from the storage compartment or is hinged thereto making accessability very difficult with a boat in place on the trailer. One container being marketed includes a tube whose open ends can be closed by removable caps. Since removable members are subject to being misplaced and hinged members are subject to wear and operating problems, the containers described above have these disadvantages. It is an object of the present invention to provide a container that is economical to manufacture, has no hinged joints or removable covers, can be easily installed on a trailer and can be extended in a drawer-like manner to gain accessability to the interior. Another object is to provide a new efficient method of making a container.

SUMMARY OF THE INVENTION

The storage container includes a member, having an internal storage compartment and a wall opening providing access to the compartment, is arranged for telescoping movement into and out of an outer member whereby the wall opening is closed and the contents in the compartment are inaccessible when the telescoping member is disposed within the outer member and are accessible through the wall opening when the inner member is withdrawn. A pair of brackets carried by the outer member adapts the container for easy mounting on the frame of a trailer or the like. A method of making the storage container involves cutting an elongated tubular member in half to provide the inner and outer members, cutting the access opening in the inner member and reforming the inner member to provide a tube of slightly smaller diameter closed at both ends.

DESCRIPTION OF THE PREFERRED EMBODIMENT

Figure 1:
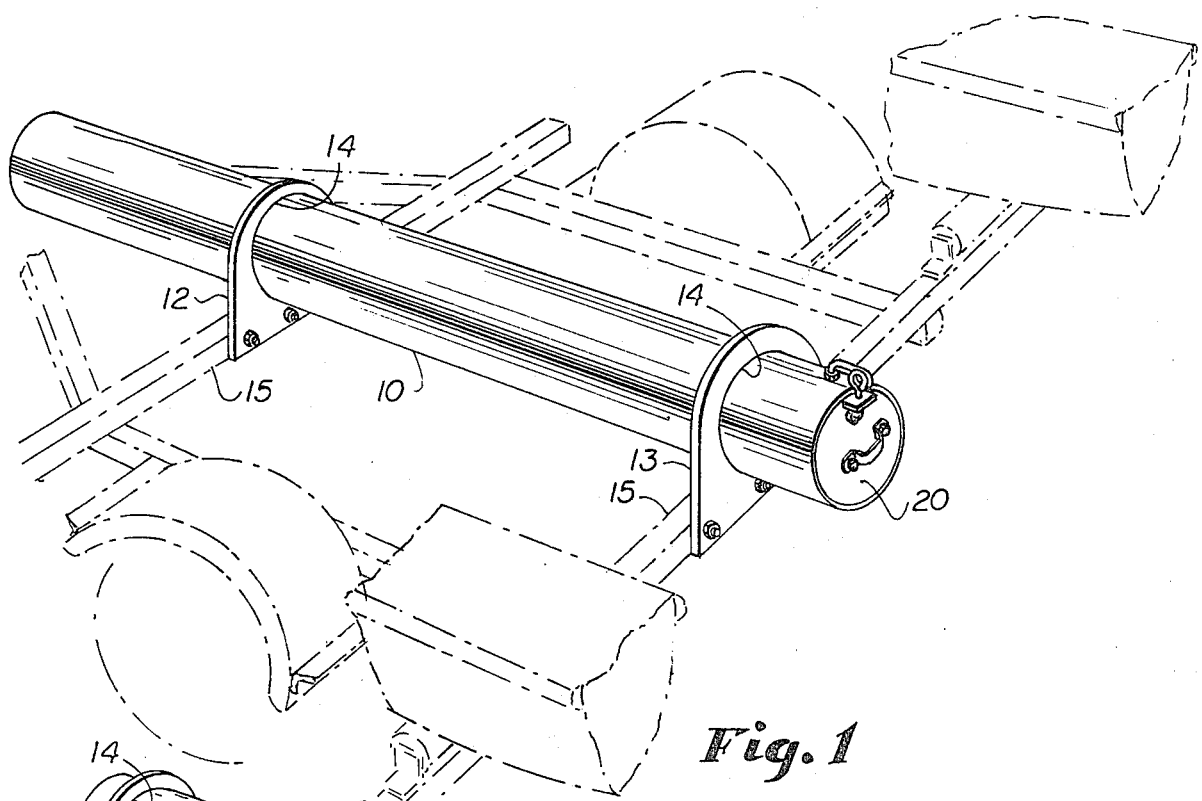
FIG. 1 is a diagrammatic perspective view of the container of the present invention shown mounted on frame members of a trailer.

In FIG. 1 the reference numeral 10 indicates a tubular housing that is open at each end. In the preferred embodiment, it is a section of a polyvinyl chloride cylindrical tube that has an internal diameter of 15 inches and a length of 10 feet. A pair of brackets 12 and 13 are secured to the tube 10, each bracket being made from a plate of polyvinyl chloride approximately one half inch and having a cylindrical opening 14 in which the tube 10 is bonded. The brackets are bolted to frame members 15 of a trailer, such as a typical trailer for catamarans.

Figure 2:
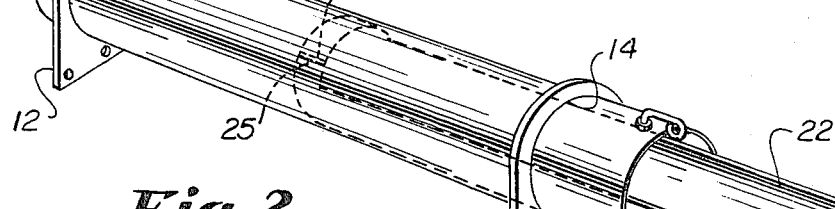
FIG. 2 is a view similar to FIG. 1 showing the internal member of the container partially withdrawn from the outer member.
Figure 3:
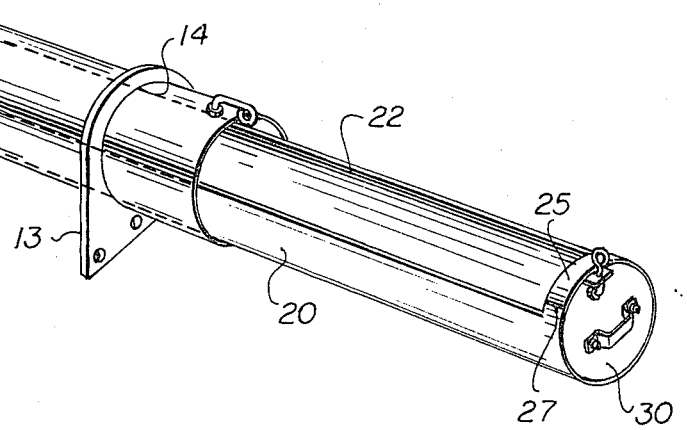
FIG. 3 is a fragmentary section taken along the lines 3—3 of FIG. 4.
Figure 3:
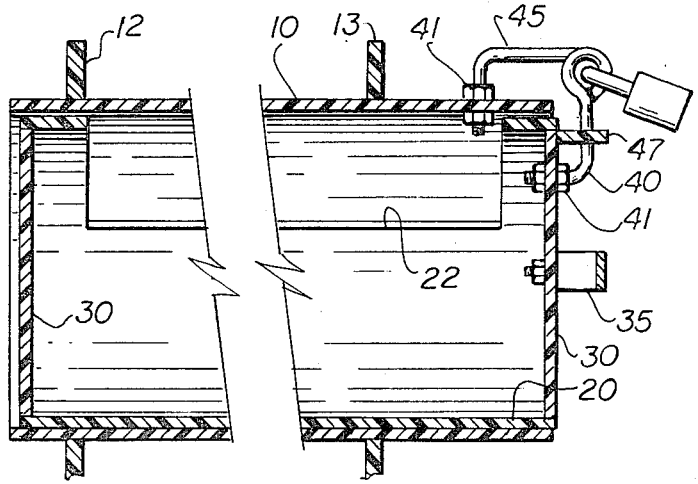
Figure 4:
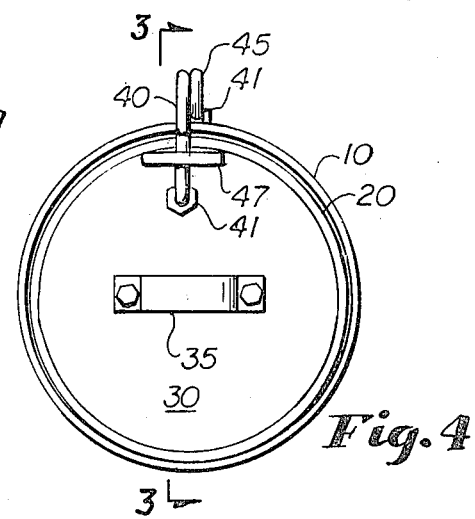
FIG. 4 is an elevational view of one end of the container of FIG. 1.

An inner member 20 is arranged to telescope into the member 10. Inner member 20 may also be made from a polyvinyl chloride cylindrical tube that has an internal diameter of 15 inches and is 10 feet long. This is done by cutting an access opening 22 (FIG. 2) in a cylindrical tube, the opening extending around about one-third of the periphery of the tube and being approximately 9 feet 5 inches long. A strap 25, which is about 3 inches long, remains at each end of the opening. A slot 27 is cut through the strap along its entire length. A cylindrical disc 30 of polyvinyl chloride stock about one-half inch thick is placed inside each end of the tube so that its outer face is flush with the edge of the tube at that end. Then, each end of the inner tube is pressed tightly around the disc and bonded thereto. When the tube is wrapped tightly around the disc, the slots 27 in the strap sections 25 are substantially closed, it being understood that the diameter of the discs and widths of the slots are chosen so that, when they are closed and the discs 30 are bonded to each end of the tube, the inner member 20 will have an outer diameter adapting it to slide into the outer tube 10. Alternatively, the inner member 20 may be fabricated by cutting the access opening and the slots in the tube, and then holding each end of the tube in circular configuration while a disc is bonded to the end surface of the tube at each end. Again, the width of the slots and the diameter of the discs are chosen to give the inner member the desired diameter.

A handle 35 is bolted to the front face of one of the end discs 30 at the front of inner member 20. When the inner member 20 has been telescoped completely into the outer tube, an eye-bolt 40 that is anchored in the front disc 30 by locknuts 41 registers with an eyebolt 45 which is similarly anchored in the outer tube 10. The shackle of a padlock can be inserted through the aligned eyes to lock the container in closed condition. The eye-bolt 40 extends upwardly through a slot or opening in a ledge 47 bonded to the upper edge of the front disc 30.

One method of making the storage container of the present invention involves the initial steps of taking a polyvinyl chloride tube that is 20 foot in length, cutting in in half to form two 10 foot tube sections, and cutting the access opening 22 and the slots 27 in one of the sections. The two discs 30 are cut to the desired diameter and one disc is secured in each slotted end of the pipe section that has the access opening to form a tube of reduced diameter. A handle is then secured to one of the ends of the section to complete the forming of the inner member of the storage container of the present invention. A lock can be installed on the container as disclosed above, if desired.

To carry out the above method of making the storage container, it is desirable that the initial 20 foot length of tubing be of uniform diameter along its length. However, 20 foot lengths of polyvinyl chloride pipe is also marketed that has a bell formed on one end, particularly adapting the pipe for use in the formation of a pipeline for enclosing underground cables and the like. Such a tube can be used to make the present storage container following the above-outlined method if the section having the bell at the end is used as the outer member of the container. When the container is formed, the bell will act as a pilot opening for guiding the inner section into the outer section whenever the inner section has been completely withdrawn from the outer section for any reason. In this case it is desirable that one or more strips of polyvinyl chloride material be wrapped around the handle-end of the inner member and secured thereto to partially fill the annular opening between the outer surface of the inner member and the inner surface of the bell.

In operation, when the inner member 20 is pulled out of the outer tube 10, sails and other gear may be placed in the inner tube through the access opening 22. The inner member 20 can then be pushed into the outer tube 10 and locked therein.

From the foregoing description it will be apparent that the present invention provides a simple container that provides easy access to the storage compartment of the container without the use of hinged doors or the like and provides easy access to the storage container when it is mounted in a confined space such as underneath a catamaran. Further, the present container is particularly economical to manufacture since it is made of readily available members.

I claim as my invention:

1. A method of making a storage container from a cylindrical member of predetermined length comprising the steps of cutting the member in half to provide two tubular sections of substantially equal length, making cuts in one section extending generally longitudinally of said one section to remove a longitudinal portion of the section and permit it to be formed into a new tubular section having a diameter less than the inner diameter of the other section, forming said one section into the new tubular configuration and securing it in said new tubular configuration, and closing the ends of said new tubular section.

2. The method of claim 1 further including the step of cutting an access opening in the wall of said one section.

3. A method of making a storage container comprising the steps of cutting an elongated tube of circular cross-section in half to provide first and second tubular sections of substantially equal length, cutting an access opening in the wall of the first section intermediate the ends of the section and leaving an uncut portion between each end of the section and an edge of the access opening, and cutting a slot in each uncut portion, the width of the slot being chosen so that the section can be formed into a new tubular section having a diameter less than the original diameter of said first section by an amount adapting said new tubular section to telescope into the second tubular section, and closing the ends of said first section.

4. A method of making a storage container from an elongated cylindrical member that is substantially uniform in diameter throughout a major portion of its length and has a bell portion of increased diameter at one end, the steps of cutting said member in half to provide two sections of generally equal length, cutting an access opening in the section that does not have the bell-end, making slots in said section between each end of the section and the access opening, said slots being wide enough to permit the section to be reformed with a smaller diameter adapting the section to telescope into the bell-end section, holding the section in a cylindrical configuration at the smaller diameter, and securing end pieces on the section to substantially close the ends of the section, the bell end of the uncut section acting as a guide for the entry of the reformed section therein.

* * * * *